United States Patent [19]

Jones et al.

[11] 4,179,551
[45] Dec. 18, 1979

[54] LOW TEMPERATURE CURABLE COMPLIANT BISMALEIMIDE COMPOSITIONS

[75] Inventors: Robert J. Jones, Hermosa Beach; Howard E. Green, Seal Beach; Sandra C. Quinlivan, Torrance, all of Calif.

[73] Assignee: TRW, Inc., Redondo Beach, Calif.

[21] Appl. No.: 845,058

[22] Filed: Oct. 25, 1977

[51] Int. Cl.$^2$ ............................................. C08F 226/06
[52] U.S. Cl. ..................................... 526/262; 428/474
[58] Field of Search .............. 260/78 UA, 47 UA, 49; 526/262

[56] References Cited

U.S. PATENT DOCUMENTS

| | | | |
|---|---|---|---|
| 3,652,511 | 3/1972 | Vincent et al. | 260/78 UA |
| 4,035,345 | 7/1977 | Ducloux et al. | 260/78 UA |
| 4,116,937 | 9/1978 | Jones et al. | 528/170 |

*Primary Examiner*—Harry Wong, Jr.
*Attorney, Agent, or Firm*—Christie, Parker & Hale

[57] ABSTRACT

Polyimide prepolymers formed by thermo-reactions of an aliphatic bismaleimide, where the aliphatic group is a polyaliphatic ether, with an aromatic bismaleimide and/or an aromatic diamine in combination with a cross-linking agent having at least two vinyl groups provide compositions which are curable at low temperatures, i.e., 65° C. or less.

49 Claims, No Drawings

LOW TEMPERATURE CURABLE COMPLIANT BISMALEIMIDE COMPOSITIONS

BACKGROUND OF THE INVENTION

Polyimides have exhibited good thermo-oxidative stability in temperature ranges up to 300° to 400° C. Thus, in applications where elevated temperatures and corrosive conditions exit, polyimides have been suggested for extensive application. Early polyimides exhibited a low percentage of elongation to break and utility was limited.

U.S. Pat. No. 3,812,082 teaches a compliant or highly flexible polyimide produced from a condensation reaction of a dianhydride and a diamine or diisocyanate. These polyimides exhibit an elongation to break of up to 300 percent, and a set at break of 25 percent or less. Thus, where a high performance sealing material is required and it can be cast, such polyimides are very suitable.

A significant advance in a practical route to flexible polyimides is taught in U.S. Pat. No. 3,951,902. In this addition-type poly (Diels-Alder) approach, a melt polymerization reaction yields polymers acceptable for use at temperatures up to 288° C. The polyimides processed by this melt process possess properties equivalent to the solution route employed in U.S. Pat. No. 3,812,082. Thus, a melt process is available to provide flexible polyimides which possess a high elongation to break and can be melt extruded or cast into a variety of products including seals, sealants, adhesives and coatings. The availability of melt and hot melt product fabrication processes means substantial cost reduction and significant lessening of human hazards and environmental pollution over polyimides produced and processed by conventional solution methods.

U.S. Pat. No. 3,652,511 teaches a water-dispersible polyimide coating formed by reacting maleic anhydride with an aliphatic diamine in solution. The polyimide product can be formed into a hard and solvent resistant film. Elastomeric or high recoverable elongation characteristics are not inherent to the solution-produced polyimide itself and are achieved only by a copolymer reaction such as reacting a sulfhydryl-terminated polymer, such as nitrile rubber, with the maleic unsaturation in the bismaleimide or the acidic side chain. This approach significantly limits or excludes their utility in terms of applications where use in seal, sealant adhesive and coatings use is required at temperatures of 120° C. or greater. Also, such resins have pendant carboxyl groups to achieve water solubility which tends to diminish their utility for general engineering applications due to possible unfavorable side reactions in high temperature use environments.

Similarly, U.S. Pat. No. 2,818,405 teaches elastomeric polyimides formed by the equal molar reaction of bismaleimides and free organic diamines. The organic diamines employed in this invention are hydrocarbon or halogenated hydrocarbon segments which restrict temperature performance to 93° C. or below. Also, the technology disclosed necessitates the use of organic tri- or tetraamines to accomplish cure of the linear imide resin initially produced. Use of the technology described therein severely limits achievement of a broad range of polymer mechanical properties because of the requirements to use 1:1 molecular reactant stoichiometry.

There has also been developed a flexible polyimide precursor produced by the Michael addition reaction of an aromatic diamine with an aromatic maleimide and a maleimide terminated polyaliphatic ether by a melt process and a cross-linked final product produced by a cure reaction. The addition reaction which forms the maleimide terminated precursor occurs in the melt at temperatures ranging from 100° to 150° C. Subsequently, when the temperature is raised to between 160° C. and 200° C., the precursor cures by a crosslinking reaction requiring no additional additives or catalysts.

The deficiency in all prior art compositions has been the need to perfect cure of solids at high temperatures of 150° C. (302° F.) or more.

A need exists for maleimide based compositions which are cureable at temperatures substantially below the cure temperatures of composition heretofore provided in the art.

SUMMARY OF THE INVENTION

According to the present invention there is provided maleimide compositions which cure at low temperatures, namely from ambient to about 65° C. or about 150° F. The compositions are based on aliphatic bismaleimides of the formula:

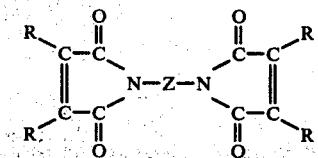

wherein Z is a polyaliphatic ether in which the aliphatic groups individually contain from 1 to about 6 carbon atoms and each R is independently hydrogen, an aliphatic group containing 1 or 2 carbon atoms, a benzenoid radical or a halogen. The aliphatic bismaleimides are curable in the presence of a free radical catalyst system and a coreactant cross linking agent providing at least two vinyl unsaturated groups such as divinyl benzene, diallyl phthalate and the like. The aliphatic bismaleimide provides elastomeric properties to the cured product.

The toughness may be imparted by forming a prepolymer of at least one aliphatic bismaleimide with at least one aromatic polyamine alone and/or with an aromatic bismaleimide as defined below. Introduction of a trismaleimide as a coreactant providing cure sites, enables elimination of the cross linking agent, the use of an acid catalyst in place of the free radical catalyst and permits cure with application of heat in the absence of a catalyst and cross linking agent.

The compositions when cured serve as adhesives, fillers coating and sealants and are available as curable compositions on total solids basis, i.e., the absence of a solvent for the reactants.

In particular, the low temperature curable composition in one instance comprises at least one aliphatic bismaleimide of the formula:

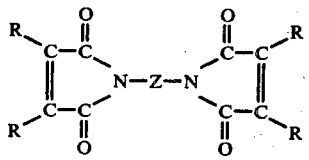

wherein Z is an aliphatic ether in which the aliphatic groups individually contain from 1 to about 6 carbon atoms, and R is as defined above, at least one cross linking agent containing at least two functional vinyl groups present in an amount sufficient to enable cure of the aliphatic bismaleimide, the composition being curable in the presence of an amount of a free radical catalyst system sufficient to initiate cure. Preferably Z has the formula:

wherein the sum of a and c is about 3.5 and b is from about 13.5 to about 45.5.

The present preferred cross linking agent is selected from the group consisting of divinyl benzene, diallyl phthalate and mixtures thereof. The preferred catalyst system comprises at least one catalyst selected from the group consisting of methyl ethyl ketone peroxide, benzoyl peroxide and mixtures thereof in combination with at least one accelerator selected from the group consisting of cobalt naphthenate, dimethyl aniline and mixtures thereof.

Another low temperature curable composition comprises a prepolymer formed of the reaction product of at least one aliphatic bismaleimide of the formula as defined above and at least one aromatic polyamine reactive with said aliphatic bismaleimide. Such prepolymers are curable in the presence of a cross linking agent and a free radical catalyst system as defined above or upon the addition of a trismaleimide also by application of heat and/or introduction of an acid catalyst. The cross linking agent and free radical catalyst system may also be present in combination with a trismaleimide.

Yet another prepolymer which is curable with the cross linking agent and free radical catalyst and in the presence of a trismaleimide also by the use of heat and/or an acid catalyst is a prepolymer of at least one aliphatic bismaleimide as defined above, at least one aromatic polyamine and/or at least one aromatic bismaleimide of the formula:

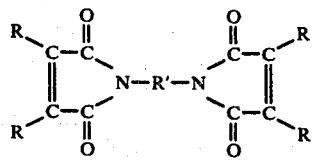

where R' is the difunctional benzenoid radical

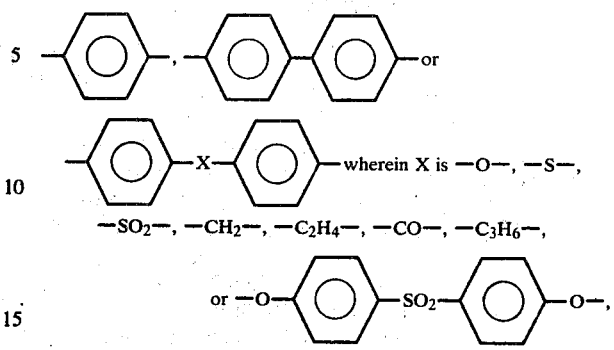

and wherein R is as defined above.

The invention is explained in greater detail in the following description as illustrated by the Examples.

DETAILED DESCRIPTION

The invention is directed to low temperature curable compositions in which an essential ingredient is at least one aliphatic bismaleimide having the formula:

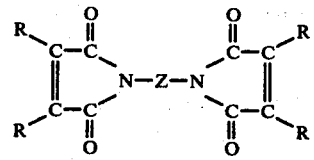

wherein Z represents polyaliphatic ethers preferably a polyaliphatic ether in which the aliphatic groups independently contain from 1 to about 6 carbon atoms and each R is independently hydrogen, an aliphatic group containing 1 or 2 carbon atoms, a benzenoid radical, or a halogen. The presently preferred aliphatic bismaleimides are those having the formula:

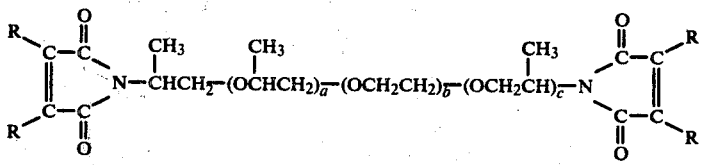

wherein the sum of a and c is about 3.5 and b is from 13.5 to about 45.5 and R is as defined above. Such bismaleimides may be formed by reacting one mole of a diamine precurser with two moles of maleic anhydride by the procedure described in U.S. Pat. No. 3,951,902 incorporated herein by reference. Other anhydrides may be used depending on the desired nature of R.

Suitable precursers are diamines manufactured and sold by Jefferson Chemical Company under the designation "Jeffamine ED" and are available as products having average molecular weights of 600, i.e., b=about 13.5; 900, i.e., b=about 20.5; and 2000, i.e., b=about 45.5. Mixtures of such amines may be employed in preparing aliphatic bismaleimides and mixture of formed bismaleimide may also be employed.

The bismaleimides are provided in the compositions of this invention to introduce a flexible backbone to the resultant cured resin to induce elastomeric properties.

Room temperature cure of the aliphatic bismaleimides alone requires the presence of coreactant cross linking agent having at least two functional vinyl unsaturated groups. Representative of such cross linking agents there may be mentioned, divinyl benzene, diallyl phthalate and the like. Cure is accomplished through a free radical catalyst systems, i.e., a peroxide alone or with accelerators as are conventionally used in the art for low temperature cure of polyester resins. Thus, as suitable peroxides for the catalyst systems there may be mentioned methyl ethyl ketone peroxide, benzoyl peroxide and the like. Suitable accelerators for such catalyst systems include cobalt naphthenate, dimethyl aniline and the like.

In another aspect of the invention, the aliphatic bismaleimides may be reacted with an aromatic polyamine to form a prepolymer which in the presence of a cross linking agent and catalyst system will cure at room temperature or in the presence of a trismaleimide as defined below will also cure in the presence of an acid catalyst and/or upon the application of modest heat, i.e., temperatures up to about 65° C.

The aromatic amines presently contemplated for reaction with the aliphatic bismaleimides to form the prepolymer are compounds of the general formula:

$$H_2N-R'-NH_2$$

wherein R' is as defined herein above.

The presently preferred aromatic polyamines are methylene dianiline and Jeffamine AP-22 which as the general formula:

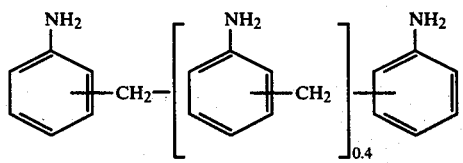

The prepolymers are generally formed by thermal reactions involving application of heat and stirring to a mixture of the monomers. Temperatures ranging from about 120° to about 130° C. may be conveniently employed.

Another desirable prepolymer is formed by reaction of at least one aliphatic bismaleimide with at least one aromatic dian and/or at least one aromatic bismaleimides having the formula:

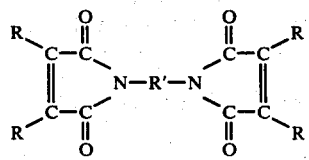

wherein R and R' are defined herein above. The presently preferred aromatic bismaleimide is bis (4-maleimidophenyl) methane.

Such prepolymers may be formed by thermal reaction of the components in a melt with stirring at temperatures from about 120° to about 150° C. to form what may be termed a polyaminobismaleimide.

For the prepolymers, cure may be realized with a cross linking agent and a free radical catalyst system as defined above alone or by other cure routes in the presence of a trismaleimide such as the trismaleimide of "Jeffamine-403" manufactured and sold by Jefferson Chemical Company, Inc. and which is of the formula:

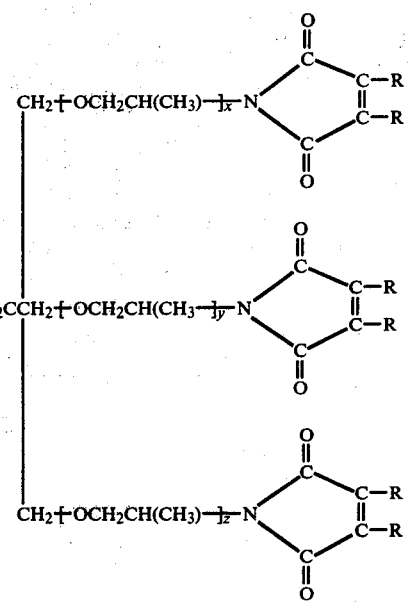

wherein the sum of x, y and z equals about 5.3 and R is as defined above.

Introduction of the trismaleimide coreactant provides cure sites which enable elimination of part or all of the cross linking and/or free radical catalyst system, permits a relative low temperature cure (65° C. or less) in the absence of a catalyst and enables acid catalyzed cure.

Thermal and acid catalyzed cure is largely through the "Michael addition reaction" (although in the absence of specific precautions to exclude air some concurrent free radical cure may occur) wherein the cross link is between amine nitrogens adjacent a saturated maleimide ring and a pendant R radical of a maleimide ring.

The low temperature curable aliphatic bismaleimide components are normally provided in solvent free state, namely total resin. A solvent may be used however as an extender and to aid in coating of a substrate.

The compositions of the invention may vary widely in forming the cured end products. When based on an aliphatic bismaleimide and a coreactant cross linking agent, the molar ratios of the aliphatic bismaleimide to cross linking agent will generally range from about 1:0.8 to about 1:2.5, preferably from about 1:0.8 to about 1:2.0. This corresponds generally to a composition containing the aliphatic bismaleimide in an amount of from about 75 to about 90 percent by weight based on the total weight of the aliphatic bismaleimide and cross linking agent.

In preparing a prepolymer, a major portion by weight of the prepolymer will also be the aliphatic bismaleimide to provide elastomeric properties and will generally comprise from about 70 to about 85 percent by weight of a prepolymer based on the aliphatic bismaleimide and an aromatic polyamine or aromatic bismaleimide. In the instance of a prepolymer based on an aliphatic bismaleimide, an aromatic polyamine and an aromatic bismaleimide, the aliphatic bismaleimide content will generally be from about 60 to about 80 percent by weight of the prepolymer.

The trismaleimide, if present, will generally comprise from about 3 to about 10 percent based on the total weight of the composition.

A catalyst, if employed, will generally present in an amount of from about 2 to about 10% by weight of the total composition.

The compositions of this invention enjoy the property of low temperature cure and provide flexible sealants and adhesives which exhibit the solvent resistance and other properties of high temperature cured polyimide resins previously available and are useful as adhesives, sealants, coating compositions and the like.

Any of the curable compositions will accept fillers, extenders, antioxidants and the like to modify the properties of the cured end product provided the introduction of such agents do not adversely affect cure.

While nowise limiting, the following Examples are illustrative of this invention.

EXAMPLE 1

Preparation Procedure of The Bis (Maleimide) of 900 Molecular Weight Jeffamine (JBM)

To a three-necked 500 ml round bottomed flask, fitted with a nitrogen inlet/outlet, thermometer, dropping funnel, and magnetic stirrer, was added 25.3 g (0.26 mole) maleic anhydride and 75 ml dimethylformamide. In a separate beaker 100 ml dimethylformamide was thoroughly mixed with 120.0 g (0.13 mole) Jeffamine ED 900. This solution was then placed in the dropping funnel and was slowly added to the stirred maleic anhydride solution. After completion addition of the Jeffamine/dimethylformamide solution, 2.3 g (0.028 mole) sodium acetate and 28.6 g (0.28 mole) acetic anhydride was added to the reaction mixture, and the mixture was heated at 50° C. for at least three hours.

After reacting at 50° C. for 3 hours the solution was cooled and the dimethylformamide was stripped off under vacuum with mild heating. When the dimethylformamide was completely removed, the remaining solution was dissolved in about 100 ml. chloroform, and this mixture was washed with distilled water three times to ensure complete removal of the sodium acetate and acetic acid. The resulting organic solution was then dried over night using 10 g magnesium sulfate. After the solution was filtered to remove the magnesium sulfate, the chloroform was stripped off in a rotary evaporator under mild heating. The resulting product was a dark brown, viscous liquid.

EXAMPLES 2-15

Employing the aliphatic bismaleimide of Example 1 (JBM); a catalyst system consisting of one part by weight methylethyl ketone peroxide to one part by weight cobalt naphthenate (catalyst A) or a catalyst system of one part by weight benzoyl peroxide to one part by weight dimethyl aniline (catalyst E) and divinyl benzene (DVB) as the cross linking agent, several room temperature cures were achieved. They are summarized in Table I.

TABLE I

| Ex. | JBM[1] (%) | JBM (moles × 10$^2$) | DVB (%) | DVB (moles × 10$^2$) | JEM:DVB (mole:mole) | Catalyst A (%) | Catalyst B (%) | Cure Time (hours), Comments |
|---|---|---|---|---|---|---|---|---|
| 2 | 80 | 0.23 | 10 | 0.23 | 1:1 | 10 | — | 24 |
| 3 | 80 | 0.23 | 10 | 0.23 | 1:1 | — | 10 | 24 |
| 4 | 88 | 0.25 | 10 | 0.23 | 1:0.9 | 2 | — | 96, partial 168, firmer |
| 5 | 85 | 0.24 | 10 | 0.23 | 1:1 | 5 | — | 24 |
| 6 | 80 | 0.23 | 10 | 0.23 | 1:1 | 10 | — | 24 |
| 7 | 78 | 0.22 | 20 | 0.46 | 1:2.1 | 2 | — | 96, partial 168, firmer |
| 8 | 75 | 0.21 | 20 | 0.46 | 1:2.2 | 5 | — | 24 |
| 9 | 70 | 0.19 | 20 | 0.46 | 1:2.4 | 10 | — | 24 |
| 10 | 88 | 0.25 | 10 | 0.23 | 1:0.9 | — | 2 | 24 |
| 11 | 85 | 0.24 | 10 | 0.23 | 1:1 | — | 5 | 24 |
| 12 | 80 | 0.23 | 10 | 0.23 | 1:1 | — | 10 | 24 |
| 13 | 79 | 0.22 | 20 | 0.46 | 1:2.1 | — | 2 | 24, very firm |
| 14 | 75 | 0.21 | 20 | 0.46 | 1:2.2 | — | 5 | 24, very firm |
| 15 | 70 | 0.19 | 20 | 0.46 | 1:2.4 | — | 10 | 24, very firm |

[1] % by weight based on total weight

EXAMPLE 16

To a melt of Jeffamine AP-22 an aromatic diamine, manufactured and sold by Jefferson Chemical Company, Inc., heated to 120° C., there was added JBM to provide a molar equivalent ratio of 1.0 mole of JBM to mole of 0.5 Jeffamine AP-22. The melt of the two was maintained at 120° C. for 75 minutes with stirring, then heated to 130° C. for 15 minutes. The reaction product was employed in Examples 19-24 of Table II below.

EXAMPLE 17

Preparation of Bis(4-Maleimidophenyl) Methane (BMPM)

To a stirred solution of 98 parts by weight of maleic anhydride in 700 parts of chloroform was added a solution of 99 parts of methylene dianiline in 600 parts of chloroform with cooling so that the temperature was maintained at 15°-20° C. The mixture was stirred for two hours, then the bright yellow precipitate of amide acid was collected by filtration, washed well with chloroform and air dried. The dried amide acid was mixed with 300 parts of acetic anhydride and 20 parts of anhydrous sodium acetate. The slurry was heated to 90° C., whereupon a clear yellow solution was obtained. The heat was removed and an exothermic reaction occurred. The stirred mixture was allowed to cool to room temperature and then added to 800 parts of cold ethanol. The precipitated bismaleimide was collected by filtration and washed with ethanol. Recrystallization of the crude product from aqueous dioxane yielded 94 g of nearly colorless bismaleimide, mp 155°-158° C. The reaction product was used in the formulations of Table II below.

EXAMPLE 18

The reactive monomer JBM was blended as with Jeffamine AP-22 (JAP-22) and BMPM in a molar equivalent ratio of 3:2:1. Two batches were prepared, one by heating a melt of the reactants at 130° C. and the other by heating a melt of the reactants at 140° C. with stirring for a time sufficient to form a prepolymer. The 140° C. reaction product used Examples 25 to 30 and 130° C. reaction product for Examples 31 to 36.

EXAMPLES 19–36

The prepolymers of Examples 16 and 18 were evaluated with various amounts of divinyl benzene using as the catalyst system, catalyst A. The results are shown in Table II. where (%) expresses the weight percent of an ingredient based on the total weight of the composition and "Equiv." means molar equivalents.

EXAMPLE 38

The composition of Examples 6, 20 and 32 were applied to urethane coated aluminum panels and allowed to cure at room temperature. Good adhesive properties and toughness were apparent but these appeared to be incompletely cured on the surface. To reduce tackiness, a composition containing 70% by weight JBM, 10% by weight DVB, and 10% by weight catalyst A and 10% by weight silica flour was prepared and applied to urethane coated aluminum test panels. The sample cured within 72 hours and exhibited less tackiness.

EXAMPLE 39

To illustrate the use of trimaleimide of Jeffamine-403, three formulations were prepared for various types of cure. The formulations were typically prepared by mix-

TABLE II

| Ex. | JBM (%) | (Equiv × 10$^2$) | JAP-22 (%) | (Equiv × 10$^2$) | BMPM (%) | (equiv × 10$^2$) | DVB (%) | (Equiv × 10$^2$) | Prepolymer:DVB Ratio (Equiv.:Equiv.) | Catalyst A (%) | Cure Timer-Hours, Comments |
|---|---|---|---|---|---|---|---|---|---|---|---|
| 19 | 84.5 | 0.48 | 8.5 | 0.25 | — | — | 5 | 0.23 | 1:1.0 | 2 | 24 |
| 20 | 81.8 | 0.46 | 8.2 | 0.24 | — | — | 5 | 0.23 | 1:1.0 | 5 | 24 |
| 21 | 77.2 | 0.44 | 7.8 | 0.23 | — | — | 5 | 0.23 | 1:1.0 | 10 | 24 |
| 22 | 80.0 | 0.30 | 8.0 | 0.16 | — | — | 10 | 0.31 | 1:2.0 | 2 | 24 |
| 23 | 77.2 | 0.29 | 7.8 | 0.15 | — | — | 10 | 0.31 | 1:2.1 | 5 | 24 |
| 24 | 72.7 | 0.27 | 7.3 | 0.14 | — | — | 10 | 0.31 | 1:2.2 | 10 | 24 |
| 25 | 75.7 | 0.29 | 9.8 | 0.20 | 8.5 | 0.10 | 4 | 0.12 | 1:0.6 | 2 | 96, Partial |
| 26 | 73.3 | 0.29 | 9.5 | 0.19 | 8.3 | 0.10 | 4 | 0.12 | 1:0.6 | 5 | 96, Partial |
| 27 | 69.2 | 0.26 | 9.0 | 0.18 | 7.8 | 0.09 | 4 | 0.12 | 1:0.7 | 10 | 96, Partial |
| 28 | 72.5 | 0.27 | 9.4 | 0.18 | 8.2 | 0.09 | 8 | 0.25 | 1:1.4 | 2 | 96, Partial |
| 29 | 70.0 | 0.26 | 9.1 | 0.18 | 7.9 | 0.09 | 8 | 0.25 | 1:1.4 | 5 | 48–96 |
| 30 | 66.0 | 0.25 | 8.5 | 0.17 | 7.5 | 0.08 | 8 | 0.25 | 1:1.5 | 10 | 48–96 |
| 31 | 75.7 | 0.29 | 9.8 | 0.19 | 8.5 | 0.10 | 4 | 0.12 | 1:0.6 | 2 | 16 |
| 32 | 73.3 | 0.28 | 9.5 | 0.19 | 8.3 | 0.09 | 4 | 0.12 | 1:0.7 | 5 | 16 |
| 33 | 67.6 | 0.26 | 8.7 | 0.18 | 7.6 | 0.09 | 4 | 0.12 | 1:0.7 | 10 | 16 |
| 34 | 72.5 | 0.27 | 9.4 | 0.18 | 8.2 | 0.09 | 8 | 0.25 | 1:1.4 | 2 | 16 |
| 35 | 70.0 | 0.26 | 9.1 | 0.18 | 7.9 | 0.09 | 8 | 0.25 | 1:1.4 | 2 | 16 |
| 36 | 66.0 | 0.25 | 8.5 | 0.17 | 7.5 | 0.08 | 8 | 0.25 | 1:1.5 | 10 | 16 |

EXAMPLE 37

The prepolymer of Example 16 was blended with divinyl benzene, present in an amount of 5% by weight based on the total weight of the composition and 2% by weight of catalyst B based on the total weight of the composition. The composition cured within minutes.

ing the ingredients in a mechanically stirred, heated vessel. The aromatic diamine was added to the vessel and heated until a melt was formed. The other ingredients were added and stirred at temperatures ranging from about 80° C. to 130° C. until a viscous liquid prepolymer was formed. Mixing time ranged from 1 to 4 hours. Cure reactions were carried out by addition of the catalysts shown below and, where used, divinyl benzene just before application to the substrate. The formulations are shown in Table III.

Table III

| Component | Formulation A gm | mole | mole ratio | Formulation B gm | mole | mole ratio | Formulation C gm | mole | mole ratio |
|---|---|---|---|---|---|---|---|---|---|
| JBM | 26.5 | 0.025 | 0.5 | 38.16 | 0.036 | 0.9 | 19.64 | 0.019 | 0.47 |
| JAP-22 | 9.91 | 0.05 | 1 | 7.93 | 0.06 | 1 | 7.94 | 0.04 | 1 |
| BMPM | 4.03 | 0.012 | 0.24 | 7.14 | 0.02 | 0.47 | 7.14 | 0.02 | 0.47 |
| TM JEF 403[2] | 4.97 | 0.009 | 0.1 | 2.69 | 0.004 | 0.1 | 1.03 | 0.002 | 0.05 |

Cure Times; Product Notes

| Catalyst and/or Temp. | Formulation A | Formulation B | Formulation C |
|---|---|---|---|
| Catalysts A & DVB | 72 hr., TF[3] | 72 hr., TF | 72 hr., TF |
| Phosphoric Acid | 3 min, G[4] | 3 min, G | 3 min, G |
| Sulfuric Acid | 1 min, G | 1 min, G | 1 min, G |
| 38° C. | 16 hr, TF | 16 hr, TF | 16 hr, TF |
| 66° C. | 4 hr, TF | 4 hr, TF | 4 hr, TF |

Table III-continued

| Catalyst A | 16 hr, TF | 16 hr, TF | 16 hr, TF |
|---|---|---|---|

(2) Tris maleimide of Jeffamine 403
(3) Tack free surface
(4) Gelled with tacky surface

What is claimed is:

1. A low temperature free radical curable composition which comprises:
   (a) a curable prepolymer which is a polyimide formed at an elevated temperature sufficient to cause thermal reaction between heated components of a mixture of:
      (i) at least one aliphatic bismaleimide of the formula:

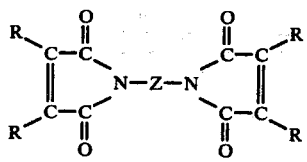

wherein Z is a polyaliphatic ether in which each aliphatic ether group individually contains from 1 to about 6 carbon atoms and in which each R is independently selected from the group consisting of hydrogen, an aliphatic group containing 1 or 2 carbon atoms, a benzenoid radical and a halogen; and
      (ii) at least one aromatic polyamine; and (b) at least one cross linking agent containing at least two functional vinyl groups.

2. A low temperature curable composition as claimed in claim 1 in which Z has the formula:

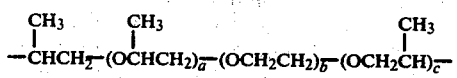

wherein the sum of a and c is about 3.5 and b is from about 13.5 to about 45.5.

3. A low temperature curable composition as claimed in claim 1 in which the aromatic polyamine is a compound of the general structure:

$$H_2N-R'-NH_2$$

wherein R' is a bifunctional benzenoid radical selected from the group consisting of:

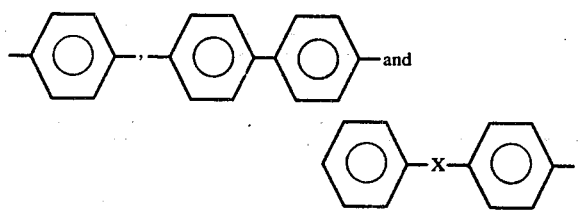

wherein X is selected from the group consisting of: —O—, —S—, —SO$_2$—, —CH$_2$—, —C$_2$H$_4$—, —CO—, —C$_3$H$_6$— and

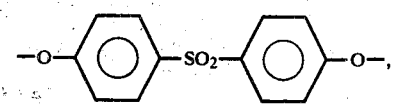

4. A curable composition as claimed in claim 1 in which aromatic polyamine is selected from group consisting of dimethyl aniline, a compound of the formula:

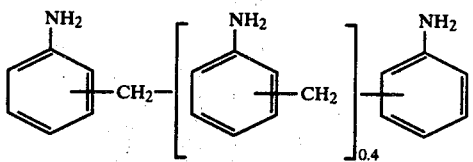

and mixtures thereof.

5. A low temperature curable composition as claimed in claim 1 in which there is provided a free radical catalyst system capable of initiating cure of the composition.

6. A low temperature curable composition as claimed in claim 1 in which the cross linking agent is selected from the group consisting of divinyl benzene, diallyl pthtalate and mixtures thereof.

7. A low temperature curable compostion as claimed in claim 5 in which the cross linking agent is selected from the group consisting of divinyl benzene, diallyl phthalate and mixtures thereof.

8. A low temperature curable composition as claimed in claim 5 in which the free radical catalyst system for said composition comprises at least one catalyst selected from the group consisting of methyl ethyl ketone peroxide and benzoyl peroxide in combination with at least one accelerator selected from the group consisting of cobalt naphthenate and dimethyl aniline.

9. A low temperature curable composition as claimed in claim 1 in which the prepolymer contains from about 70 to about 85 percent by weight of the aliphatic bismaleimide based on the total weight of the prepolymer.

10. A composition as claimed in claim 5 in which the free radical catalyst is present in an amount of from about 2 to about 10 percent by weight based on the total weight of the composition.

11. A low temperature free radical curable composition comprising:
   (a) a curable prepolymer which is a polyimide formed at an elevated temperature sufficient to cause thermal reaction between heated components of a mixture of:
      (i) at least one aliphatic bismaleimide of the formula:

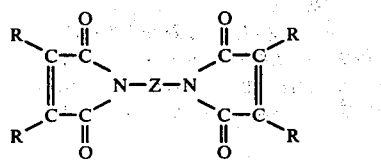

wherein Z is a polyaliphatic ether in which each aliphatic group individually contains from 1 to about 6 carbon atoms, and in which R is independently selected from the group consisting of hydrogen, an aliphatic group containing 1 or 2 carbon atoms, a benzenoid radical and a halogen;
(ii) at least one aromatic polyamine; and
(iii) at least one aromatic bismaleimide of the formula:

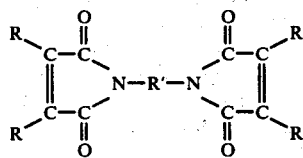

group consisting of hydrogen, an aliphatic group containing 1 or 2 carbon atoms, a benzenoid radical and a halogen and wherein R' is a bifunctional benzenoid radical selected from the group consisting of:

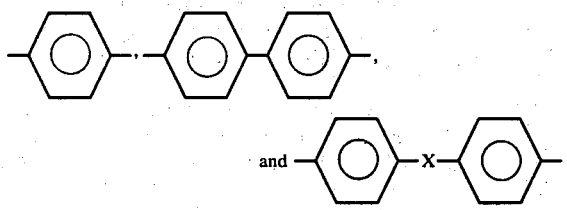

wherein X is selected from the group consisting of: —O—, —S—, —SO$_2$—, —CH$_2$—, —C$_2$H$_4$—, —CO—, —C$_3$H$_6$—, and

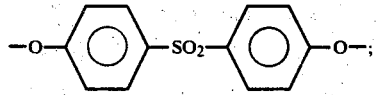

and
(b) at least one cross linking agent containing at least two functional vinyl groups.

12. A low temperature curable composition as claimed in claim 11 in which Z has the formula:

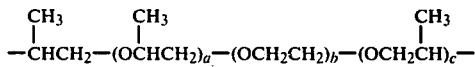

wherein the sum of a and c is about 3.5 and b is from about 13.5 to about 45.5.

13. A low temperature curable composition as claimed in claim 11 in which the aromatic polyamine is a compound of the formula:

wherein R' is a bifunctional benzenoid radical selected from the group consisting of

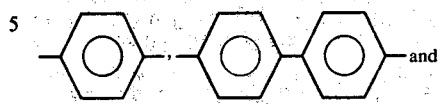

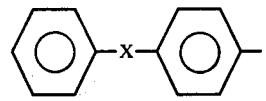

wherein X is selected from the group consisting of —O—, —S—, —SO$_2$—, —CH$_2$—, —C$_2$H$_4$—, —CO—, —C$_3$H$_6$—, and

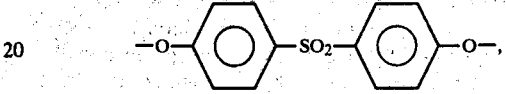

14. A curable composition as claimed in claim 11 in which aromatic polyamine is selected from a group consisting of methylene dianiline, a compound of the general formula:

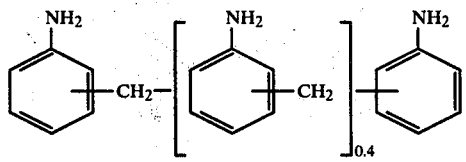

and mixtures thereof.

15. A low temperature curable composition as claimed in claim 11 in which there is provided a free radical catalyst system capable of initiating cure of the composition.

16. A low temperature curable composition as claimed in claim 11 in which the cross linking agent is selected from the group consisting of divinyl benzene, diallyl phthalate and mixtures thereof.

17. A low temperature curable composition as claimed in claim 15 in which the cross linking agent is selected from the group consisting of divinyl benzene, diallyl phthalate and mixtures thereof.

18. A low temperature curable composition as claimed in claim 15 in which the free radical catalyst system for said composition comprises at least one catalyst selected from the group consisting of methyl ethyl ketone peroxide and benzoyl peroxide in combination with at least one accelerator selected from the group consisting of cobalt naphthenate, and dimethyl aniline.

19. A low temperature curable composition as claimed in claim 11 in which the prepolymer contains from about 60 to about 80 percent by weight aliphatic bismaleimide based on the total weight of the prepolymer.

20. A composition as claimed in claim 15 in which the free radical catalyst is present in an amount of from about 2 to about 10 percent by weight based on the total weight of the composition.

21. A low temperature curable composition as claimed in claim 11 in which the aromatic bismaleimide is bis (4-maleimidophenyl) methane.

22. A low temperature free radical curable composition comprising:
(a) a curable prepolymer which is a polyimide formed at an elevated temperature sufficient to cause thermal reaction between heated components of a mixture of:
(i) at least one aliphatic bismaleimide of the formula:

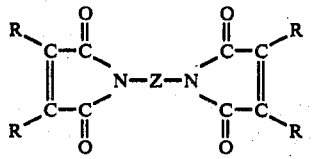

wherein Z is a polyaliphatic ether in which each aliphatic group individually contains from 1 to about 6 carbon atoms, and in which each R is independently selected from the group consisting of hydrogen, an aliphatic group containing 1 or 2 carbon atoms, a benzenoid radical and a halogen; and
(ii) at least one aromatic bismaleimide of the formula:

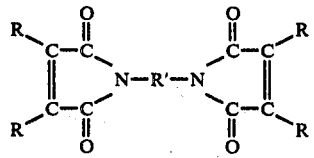

wherein R is independently selected from the group consisting of hydrogen, an aliphatic group containing 1 to 2 carbon atoms, a benzenoid radical and a halogen, and wherein R' is a bifunctional benzenoid radical selected from the group consisting of:

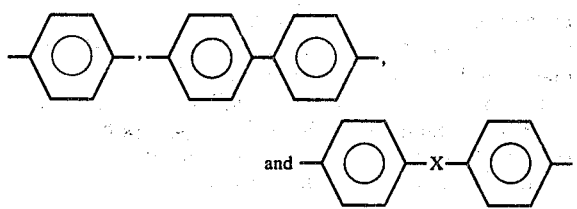

wherein X is selected from the group consisting of $-O-$, $-S-$, $-SO_2-$, $-CH_2-$, $-C_2H_4-$, $-CO-$, $-C_3H_6-$, and

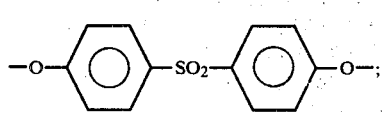

and
(b) at least one cross linking agent containing at least two functional vinyl groups.

23. A low temperature curable composition as claimed in claim 22 in which Z has the formula

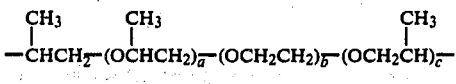

wherein the sum of a and c is about 3.5 and 6 is from about 13.5 to about 45.5.

24. A low temperature curable composition as claimed in claim 22 in which there is provided a free radical catalyst system capable of initiating cure of the composition.

25. A low temperature curable composition as claimed in claim 22 in which the cross linking agent is selected from the group consisting of divinyl benzene, diallyl phthalate and mixtures thereof.

26. A low temperature curable composition as claimed in claim 24 in which the cross linking agent is selected from the group consisting of divinyl benzene, diallyl phthalate and mixtures thereof.

27. A low temperature curable composition as claimed in claim 24 in which the free radical catalyst system for said composition comprises at least one catalyst selected from the group consisting of methyl ethyl ketone peroxide and benzoyl peroxide in combination with at least one accelerator selected from the group consisting of cobalt naphthenate and dimethyl aniline.

28. A low temperature curable composition as claimed in claim 22 in which the prepolymer contains from about 60 to about 80 percent by weight aliphatic bismaleimide based on the total weight of the prepolymer.

29. A composition as claimed in claim 24 in which the free radical catalyst is present in an amount of from about 2 to about 10 percent by weight based on the total weight of the composition.

30. A low temperature curable composition as claimed in claim 22 in which the aromatic bismaleimide is bis (4-maleimidophenyl) methane.

31. A low temperature free radical curable composition which comprises:
(a) a curable prepolymer which is a polyimide formed at an elevated temperature sufficient to cause thermal reaction between heated components of a mixture of:
(i) at least one aliphatic bismaleimide of the formula:

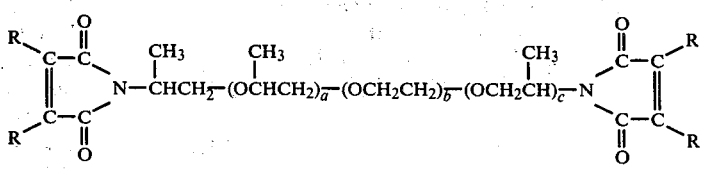

wherein the sum of a and c is about 3.5 and b is from about 13.5 to about 45.5 and in which R is independently selected from the group consisting of hydrogen, an aliphatic group containing 1 or 2 carbon atoms, a benzenoid radical and a halogen; and
(ii) at least one aromatic polyamine of the formula:

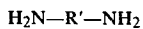

wherein R' is a bifunctional benzenoid radical selected from the group consisting of:

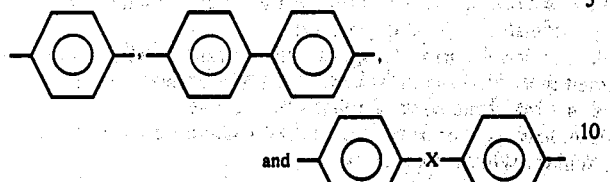

wherein X is selected from the group consisting of: —O—, —S—, —SO$_2$—, —CH$_2$—, —C$_2$H$_4$—, —CO—, —C$_3$H$_6$— and

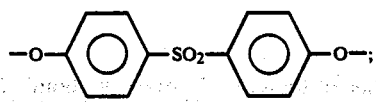

and (b) at least one cross linking agent containing at least two functional vinyl groups.

32. A low temperature free radical curable composition which comprises:

(a) a curable prepolymer which is a polyimide formed at an elevated temperature sufficient to cause thermal reaction between heated components of a mixture of:
(i) at least one aliphatic bismaleimide of the formula:

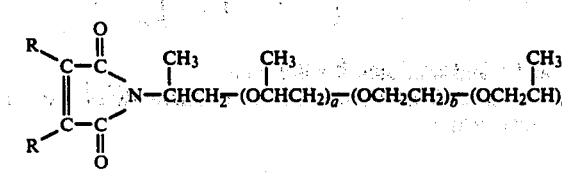

wherein the sum of a and c is about 3.5 and b is from about 13.5 to about 45.5 and in which each R is independently selected from the group consisting of hydrogen, an aliphatic group containing 1 or 2 carbon atoms, a benzenoid radical and a halogen; and (ii) an aromatic polyamine selected from the group consisting of dimethyl aniline, a compound of the formula:

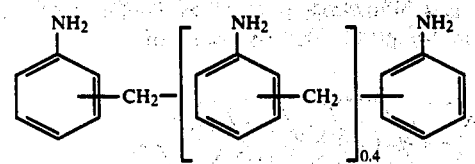

and mixtures thereof; and (b) at least one cross linking agent containing at least two functional vinyl groups.

33. A low temperature free radical curable composition which comprises:

(a) a curable prepolymer which is a polyimide formed at an elevated temperature sufficient to cause thermal reaction between heated components of a mixture of:
(i) at least one aliphatic bismaleimide of the formula:

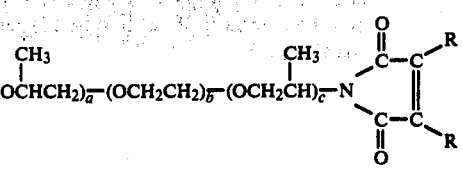

wherein the sum of a and c is about 3.5 and b is from about 13.5 to about 45.5 and in which each R is independently selected from the group consisting of hydrogen, an aliphatic group containing 1 or 2 carbon atoms, a benzenoid radical and a halogen;

(ii) at least one aromatic polyamine of the formula:

H$_2$N—R'—NH$_2$ wherein R' is a bifunctional benzenoid radical selected from the group consisting of:

wherein X is selected from the group consisting of: —O—, —S—, —SO$_2$—, —CH$_2$—, —C$_2$H$_4$—, —CO—, —C$_3$H$_6$—and

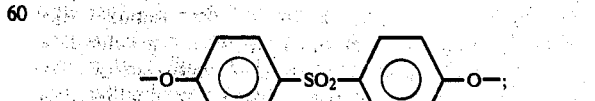

and
(iii) at least one aromatic bismaleimide of the formula:

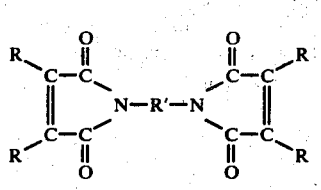

wherein R is independently selected from the group consisting of hydrogen, an aliphatic group containing 1 or 2 carbon atoms, a benzenoid radical and a halogen and wherein R' is a bifunctional benzenoid radical selected from the group consisting of:

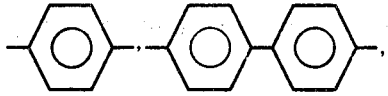

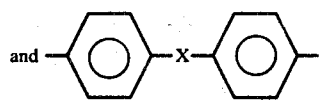

wherein X is selected from the group consisting of: —O—, —S—, —SO$_2$—, —CH$_2$—, —C$_2$H$_4$—, —CO—, —C$_3$H$_6$—and

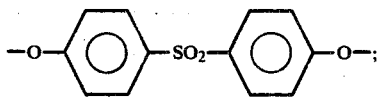

and (b) at least one cross linking agent containing at least two functional vinyl groups.

34. A low temperature curable composition as claimed in claim 33 in which there is provided a free radical catalyst system capable of initiating cure of the composition.

35. A low temperature curable composition as claimed in claim 33 in which the cross linking agent is selected from the group consisting of divinyl benzene, diallyl phthalate and mixtures thereof.

36. A low temperature curable composition as claimed in claim 34 in which the cross linking agent is selected from the group consisting of divinyl benzene, diallyl phthalate and mixtures thereof.

37. A low temperature curable composition as claimed in claim 34 in which the free radical catalyst system for said composition comprises at least one catalyst selected from the group consisting of methyl ethyl ketone peroxide and benzoyl peroxide in combination with at least one accelerator selected from the group consisting of cobalt naphthenate, and dimethyl aniline.

38. A low temperature curable composition as claimed in claim 33 in which the prepolymer contains from about 60 to about 80 percent by weight aliphatic bismaleimide based on the total weight of the prepolymer.

39. A composition as claimed in claim 34 in which the free radical catalyst is present in an amount of from about 2 to about 10 percent by weight based on the total weight of the composition.

40. A low temperature curable composition as claimed in claim 33 in which the aromatic bismaleimide is bis (4—maleimidophenyl) methane.

41. A low temperature free radical curable composition which comprises:

(a) a curable prepolymer which is a polyamide formed at an elevated temperature sufficient to cause thermal reaction between heated components of a mixture of:

(i) at least one aliphatic bismaleimide of the formula:

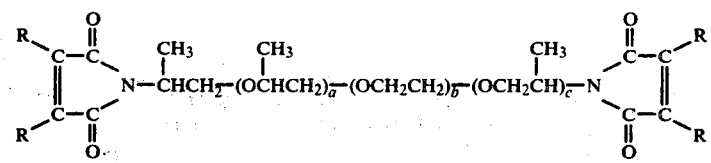

wherein the sum of a and c is about 3.5 and b is from about 13.5 to about 45.5 and in which R is indpendently selected from the group consisting of hydrogen, an aliphatic group containing 1 or 2 carbon atoms, a benzenoid radical and a halogen;

(ii) an aromatic polyamine selected from the group consisting of dimethyl aniline, a compound of the formula:

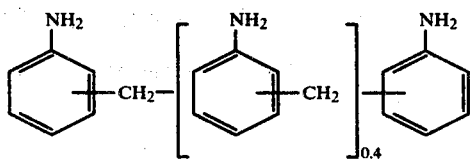

and mixtures thereof; and (iii) at least one aromatic bismaleimide of the formula:

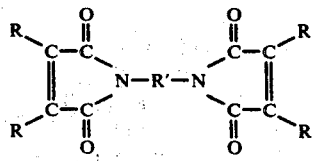

wherein R is independently selected from the group consisting of hydrogen, an aliphatic group containing 1 or 2 carbon atoms, a benzenoid radical and a halogen and wherein
R' is a bifunctional benzenoid radical selected from the group consisting of:

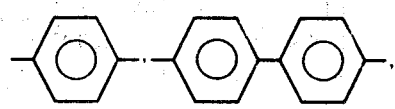

-continued and 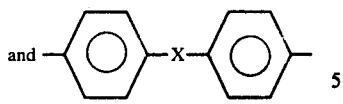

wherein X is selected from the group consisting of: —O—, —S—, —SO$_2$—, —CH$_2$—, —C$_2$H$_4$—, —CO—, —C$_3$H$_6$—and

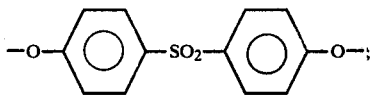

and (b) at least one cross linking agent containing at least two functional vinyl groups.

42. A low temperature curable composition as claimed in claim 41 in which there is provided a free radical catalyst system capable of initiating cure of the composition.

43. A low temperature curable composition as claimed in claim 41 in which the cross linking agent is selected from the group consisting of divinyl benzene, diallyl phthalate and mixtures thereof.

44. A low temperature curable composition as claimed in claim 42 in which the corss linking agent is selected from the group consisting of divinyl benzene, diallyl phthalate and mixtures thereof.

45. A low temperature curable composition as claimed in claim 42 in which the free radical catalyst system for said composition comprises at least one catalyst selected from the group consisting of methyl ethyl ketone peroxide, and benzoyl peroxide in combination with at least one accelerator selected from the group consisting of cobalt naphthenate, and dimethyl aniline.

46. A low temperature curable composition as claimed in claim 41 in which the prepolymer contains from about 60 to about 80 percent by weight aliphatic bismaleimide based on the total weight of the prepolymer.

47. A composition as claimed in claim 42 in which the free radical catalyst is present in an amount of from about 2 to about 10 percent by weight based on the total weight of the composition.

48. A low temperature curable composition as claimed in claim 41 in which the aromatic bismaleimide is bis (4—maleimidophenyl) methane.

49. A low temperature free radical curable composition comprising:

(a) a curable prepolymer which is a polyimide formed at an elevated temperature sufficient to cause thermal reaction between heated components of a mixture of:
  (i) at least one aliphatic bismaleimide of the formula:

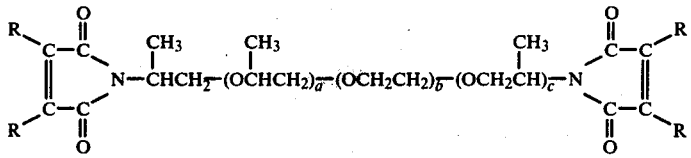

wherein the sum of a and c is about 3.5 and b is from about 13.5 to about 45.5 and in which each R is independently selected from the group consisting of hydrogen, an aliphatic group containing 1 or 2 carbon atoms, a benzenoid radical and a halogen; and (ii) at least one aromatic bismaleimide of the formula:

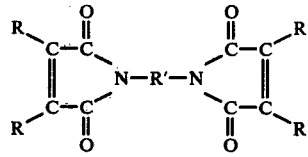

wherein R is independently selected from the group consisting of hydrogen, an aliphatic group containing 1 or 2 carbon atoms, a benzenoid radical and a halogen, and wherein
R' is a bifunctional benzenoid radical selected from the group consisting of:

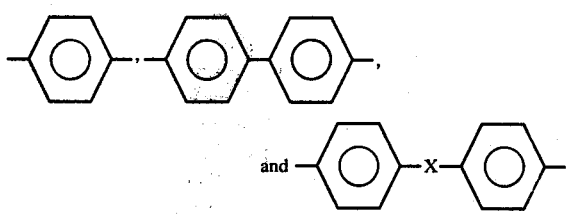

wherein X is selected from the group consisting of: —O—, —S—, —SO$_2$—, —CH$_2$—, —C$_2$H$_4$—, —CO—, —C$_3$H$_6$—and

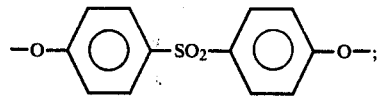

and (b) a coreactant selected from the group consisting of a cross linking agent containing at least two functional vinyl groups.

* * * * *